Jan. 18, 1938.　　　H. B. HASS ET AL　　　2,105,733
CHLORINATION PROCESS
Filed June 8, 1935
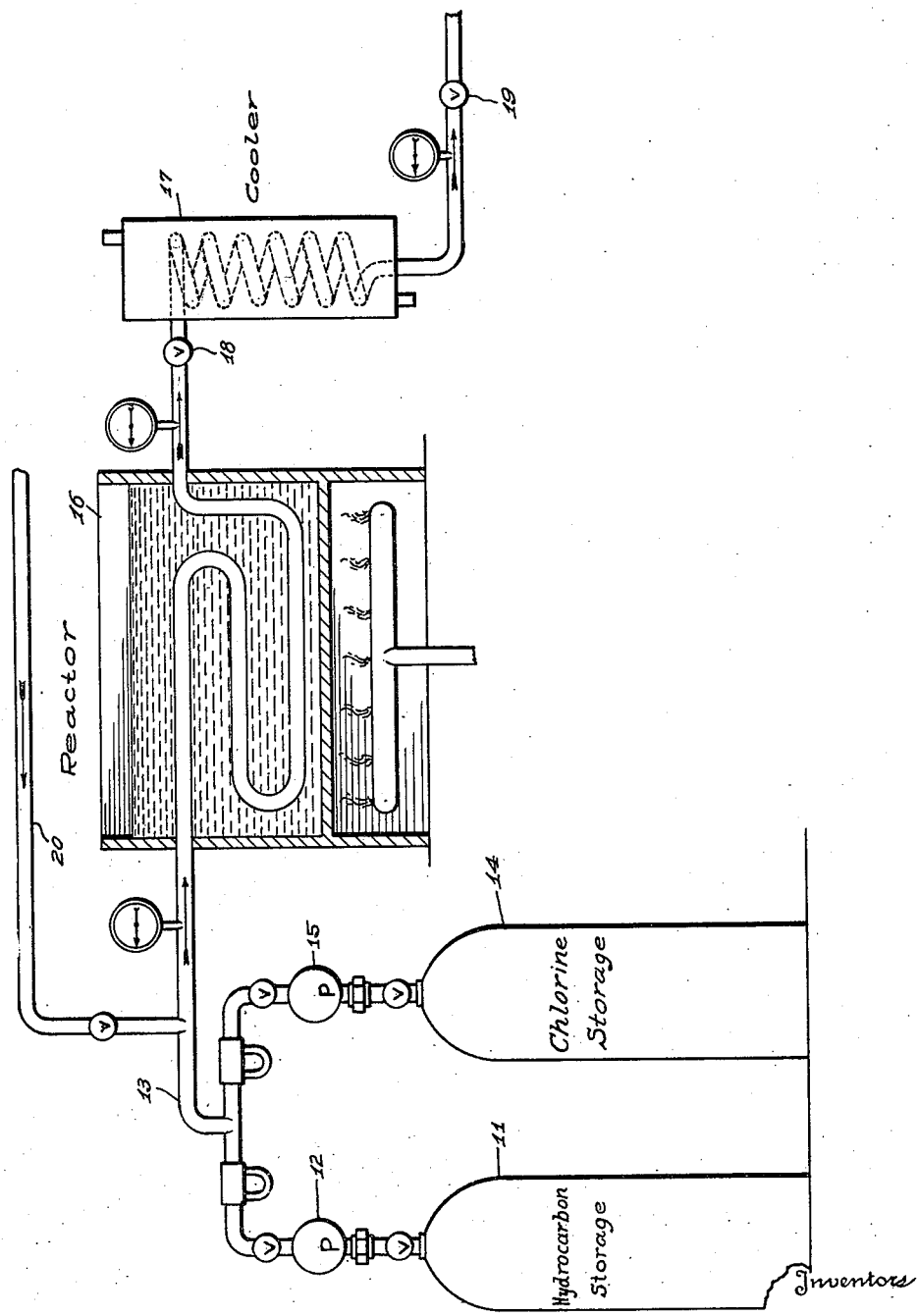
Inventors
HENRY B. HASS and
EARL T. McBEE,
By
Jokley & Trask
Attorneys Patented Jan. 18, 1938

2,105,733

UNITED STATES PATENT OFFICE 2,105,733

CHLORINATION PROCESS

Henry B. Hass and Earl T. McBee, West Lafayette, Ind., assignors to Purdue Research Foundation, West Lafayette, Ind., a corporation of Indiana Application June 8, 1935, Serial No. 25,632

13 Claims. (Cl. 260—162)

It is the object of our invention to improve and obtain certain advantages in the process of substitutively chlorinating saturated hydrocarbons of the paraffin and naphthene series, particularly those of not to exceed 16 carbon atoms, and their partially chlorinated derivatives.

Considerable work has already been done in the chlorination of compounds of this general type. Among the general procedures which have been used are the following:

Prior Process 1: The hydrocarbon vapor is mixed with chlorine, and the mixture is heated to effect chlorination, either in the presence or absence of catalysts, at or near atmospheric pressure. For instance, see the Ayres Patent No. 1,717,136.

Prior Process 2: The hydrocarbon vapor is preheated to reaction temperature, and chlorine is injected at high velocity to effect chlorination. See our Patent No. 2,004,072, granted June 4, 1935.

Prior Process 3: The hydrocarbon, either in liquid phase or in vapor phase, is treated with chlorine in the presence of light, either at or near atmospheric pressure.

Prior Process 4: A catalyst, for example iodine, is dissolved in a higher liquid hydrocarbon, for example hexane, in liquid phase at or near atmospheric pressure; and the hydrocarbon with such catalyst dissolved in it is heated with chlorine to effect the chlorination.

Prior Process 5: A mixture of a saturated hydrocarbon with a small amount of an olefine, is treated with chlorine at or near atmospheric pressure. The presence of the olefine accelerates the substitutive chlorination of the co-present saturated hydrocarbon.

Prior Process 6: Hydrocarbons of high molecular weight, having at least 17 carbon atoms, have been chlorinated in liquid phase at substantially atmospheric pressure and elevated temperature.

Our chlorination process differs from these prior processes in that it is carried out under high pressure, of at least ten atmospheres, with the material to be chlorinated either in liquid phase or in a highly compressed vapor phase. If desired, it can be carried out in the absence of both light and a catalyst; and we prefer that course.

By the use of high pressure, we are able to get a number of advantages.

With some hydrocarbons we are able to maintain a liquid phase instead of a vapor phase by reason of the pressure, and thus to operate at a higher temperature in the liquid phase. The temperature which we use, whether the material to be chlorinated is in liquid phase or in vapor phase, is sufficiently high so that it is capable of causing rapid reaction between chlorine and such material in the absence of light and a catalyst—by which we mean, as pointed out in our aforesaid Patent No. 2,004,072, a chlorination reaction that is at least 90% complete within one minute.

By reason of the pressure we are able to increase the concentration, relative as well as absolute, of materials to be chlorinated that exist in vapor phase at normal or near-normal pressure.

In addition, we are able to increase the absolute concentration of chlorine whether the material to be chlorinated is in the liquid phase (Henry's law) or in the vapor phase; and in this way we are able to get an increased velocity of reaction, limited only by the increased violence of the reaction at higher chlorine concentrations, and in consequence to decrease the time of exposure to pyrolytic conditions.

Further, the high pressure creates a tendency to push to the left the reversible reaction of which the following equation is an example:

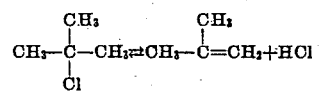

Our process also makes it unnecessary to use fragile material such as transparent glass or silica, such as are necessary when the reaction is accelerated by light.

In certain prior thermal processes, pyrolysis causes frequent shut-downs, made necessary to remove accumulations of carbonaceous deposits in the chlorination tubes. We can substantially completely avoid these shut-downs—indeed, we can often do so completely in liquid-phase operation.

In addition, by increasing the temperature of the material to be chlorinated in high concentration, either in liquid phase or in vapor phase under high pressure, we are able to increase the proportion of primary chlorination to secondary and/or tertiary chlorination.

This increase in the proportion of primary chlorides, and the consequent decrease in the proportions of secondary and/or tertiary chlorides, is produced by raising the temperature of chlorination even in vapor-phase chlorination at normal pressure, as is pointed out in our aforesaid Patent No. 2,004,072; but the effect is more pronounced when the material to be chlorinated is in liquid phase. In consequence, greater yields of the primary chlorides, which are usually more desirable than the isomeric secondary or tertiary chlorides, can be obtained at lower temperatures in liquid phase under high pressure than in vapor phase at normal pressure.

Further, because the chlorination can be at lower temperature, and in liquid-phase operation no vaporization precedes the chlorination, the heat requirement of the reaction is greatly reduced as compared to vapor-phase chlorination at high temperature at normal pressure.

In addition, temperature control is facilitated by having the higher concentration, whether in liquid phase or in vapor phase under compression, since heat transfer between the solid walls of the chlorinator and its contents is better than it is between such solid walls and a gas at or near atmospheric pressure.

However, there are two disadvantages to our process.

First, the explosive limits of hydrocarbon-chlorine mixtures are wider at high concentration, whether in liquid phase or in vapor phase under compression, than at low concentration, such as in vapor phase at normal pressure; so that more care must be used to avoid explosions. In consequence, although the absolute concentration of chlorine is increased, it is necessary (unless an inert liquid diluent is used as hereinafter set forth) to have a larger excess of the material to be chlorinated over the chlorine used than is necessary in vapor-phase chlorination at atmospheric pressure. But this is not a serious disadvantage, for it is almost always desirable for other reasons to use a large excess of the material to be chlorinated; for example, in order to diminish the over-chlorination of such material.

Second, special pumps are required, that are suitable for pumping liquid chlorine and liquid hydrocarbon under pressure to the chlorinator; but such pumps are available.

These two difficulties are thus relatively minor, and, especially in the case of the lower hydrocarbons, may even be lessened by the use of an inert liquid diluent, such as carbon tetrachloride, which not only maintains liquidity but also permits greater relative concentrations of chlorine to be used without danger of explosion.

The use of an inert liquid diluent in which both chlorine and the material to be chlorinated are freely soluble is especially advantageous in the chlorination of materials of low boiling point—such as those having boiling points below that of carbon tetrachloride if carbon tetrachloride is the liquid diluent used. For instance, methane may be chlorinated by dissolving it in carbon tetrachloride which already contains dissolved chlorine, and subjecting the composite solution to a temperature of 200° C. under sufficient pressure to maintain the mixture at least largely in liquid phase. The vapor pressure of carbon tetrachloride at 200° C. is approximately 14.4 atmospheres, so that a pressure at least as great as that should be employed in this chlorination of methane at this temperature. However, the exact pressure required naturally depends upon the concentration of the reactants in the carbon tetrachloride and varies with that concentration. After the chlorination, the inert liquid diluent is usually removed, as by rectification, so that it may be re-used. According to our invention, pressures are used in excess of ten atmospheres. There may be a very considerable excess in pressure above ten atmospheres, for we have found no upper limit of pressure save that imposed by the strength of the apparatus. For instance, we have obtained excellent results with pressures of 40 to 70 atmospheres. With these high pressures, either in liquid phase or at high concentration in vapor phase, we are able to obtain rapid reaction in a temperature range much lower than that required to obtain as rapid reaction at atmospheric pressure, and we thus lessen the effects of pyrolysis. By "rapid reaction," as already stated, we mean a chlorination reaction which is at least 90% complete within one minute in the absence of light and of a chlorination catalyst.

A suitable apparatus for carrying out our process is shown in the accompanying drawing, of which the single figure is a diagrammatic representation of such an apparatus.

In such apparatus, an excess of the liquid hydrocarbon to be chlorinated (for example, methane, ethane, propane ... hexadecane among the paraffins, and cyclohexane and decalin among the naphthenes, with a suitable inert diluent such as carbon tetrachloride to maintain liquidity in the case of the more volatile hydrocarbons) is pumped from a hydrocarbon-storage tank 11 by a pump 12 to a suitable mixing pipe 13 into which liquid chlorine is also pumped from the chlorine-storage tank 14 by a pump 15. From the mixing-pipe 13 the liquid mixture of chlorine with an excess of hydrocarbon, and with the inert diluent if it is used, flows through a reactor 16, where it is heated to cause reaction, to a cooler 17; and thence to suitable separating apparatus, such for instance as that shown in our aforesaid Patent No. 2,004,072, so that the unreacted hydrocarbon, with the inert diluent if present, may be returned by the pipe 20 and recycled. If desired, any of the chlorides obtained may also be recycled, such for instance as mono-chlorides if it is desired to obtain dichlorides. No heat-exchange mechanism is essential between the out-flow fluids and the in-flow fluids, although neither is it essential that there be none.

Regulating valves 18 and 19 are provided at the outlets of the reactor 16 and cooler 17 to control the pressures within the reactor and the cooler respectively, and to make possible high temperatures in the reactor while maintaining the liquid phase. If temperatures are desired above the critical temperature of the material to be chlorinated, as we find advantageous in certain cases, an inert diluent such as carbon tetrachloride may be used, and it is in that case that such diluent is separated from the unrecycled reaction products and recycled with the unreacted hydrocarbon and any chlorides of which it is desired to obtain further chlorination. In case the inert diluent is not used, and the temperatures are such that the material to be chlorinated is above the critical temperature and hence in vapor phase, our apparatus is nevertheless suitable and effective, because of the high concentration which is obtained by reason of the high pressure used.

We prefer at present, although it is not essential to our invention, to operate with the reactor at temperatures above 100° C., and ordinarily not above 350° C. and frequently not above 250° C.; and with pressures which though above the minimum of 10 atmospheres do not exceed 150 atmospheres.

When carbon tetrachloride is used as an inert diluent to carry the material to be chlorinated, the mixing pipe 13 may be put within the reactor 16 if desired, with separate leading-in pipes which are also in that reactor, so that the hydrocarbon with its inert diluent and the chlorine may be separately heated before being mixed; in the same general manner as is shown for vapor-phase chlorination in our aforesaid Patent No. 2,004,072.

The following are examples of chlorination by our process:

Example 1

Carbon tetrachloride, saturated with methane at a pressure of five atmospheres, is placed in the hydrocarbon-storage tank 11, and the pumps 12 and 15 and the valves are so operated that in the mixing pipe 13 mixing is obtained of between three and four mols of chlorine for each mol. of methane. The resultant solution of methane and chlorine in carbon tetrachloride is heated to about 240° to 250° C. in the reactor, which in this case is desirably a nickel tube immersed in a molten mixture of potassium nitrate and sodium nitrite in eutectic proportions. The rate at which the solution is pumped through the reactor is regulated by testing the effluent chlorinated product for free chlorine, and is controlled so that little or no chlorine escapes reaction. A pressure is maintained in the reactor of about 70 atmospheres. The chlorinated product obtained is principally carbon tetrachloride containing some chloroform. In this case carbon tetrachloride is both the inert diluent and one of the principal final products.

Example 2

Propane dissolved in a quantity of carbon tetrachloride is placed in the hydrocarbon-storage tank 11, and the pumps and valves are so operated that one mol. of chlorine is mixed with from five to ten mols of dissolved propane; and the solution is chlorinated as in Example 1. With these proportions, the principal product obtained on the passage through the reactor is 1-chloropropane. This may be recycled to obtain more highly chlorinated products, chief among which are 1,2-dichloropropane and 1,3-dichloropropane. For this chlorination we prefer a temperature of about 200° C., at a pressure of about 40 to 50 atmospheres.

Example 3

A liquid pentane, dissolved if desired in carbon tetrachloride (although that is not necessary), is placed in the hydrocarbon-storage tank 11, and the pumps and valves are operated so that a mixture is produced in the mixing pipe 13 of one mol. of chlorine to about ten mols of pentane. The operation is conducted as in Examples 1 and 2.

Example 4

A kerosene fraction having a distillation range of 200° to 250° C., which indicates that the fraction is largely a mixture of hydrocarbons having from 11 to 16 carbon atoms, is placed in the hydrocarbon storage tank 11, and the pumps and valves are operated so that a mixture is produced in the mixing pipe 13 of about 1 mol. of chlorine to 5 mols of hydrocarbons. The operation is then conducted as in Examples 1 and 2.

The above examples are intended to be illustrative only, and are not given as limitations of our invention beyond the terms of the claims. Such factors as concentrations, pressures (with a minimum of 10 atmospheres), temperatures, nature of hydrocarbon or chloro-hydrocarbon used as the material to be chlorinated, diluent (if any), material and shape of the chlorinator, etc., may be varied without departing from the spirit of our invention.

We claim as our invention:

1. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated under a pressure in excess of ten atmospheres to a temperature which is capable of causing a reaction between them which is at least 90% complete within one minute in the absence of light and a catalyst.

2. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated under a pressure in excess of ten atmospheres to a temperature which is capable of causing a reaction between them which is at least 90% complete within one minute in the absence of light and a catalyst, with the material to be chlorinated in liquid phase.

3. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated under a pressure in excess of ten atmospheres to a temperature which is capable of causing a reaction between them which is at least 90% complete within one minute in the absence of light and a catalyst, with the material to be chlorinated in vapor phase.

4. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated under a pressure in excess of ten atmospheres to a temperature which is capable of causing a reaction between them which is at least 90% complete within one minute in the absence of light and a catalyst, with the material to be chlorinated dissolved in an inert liquid diluent.

5. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated under a pressure in excess of ten atmospheres to a temperature which is capable of causing a reaction between them which is at least 90% complete within one minute in the absence of light and a catalyst, with the material to be chlorinated dissolved in carbon tetrachloride.

6. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated under a pressure in excess of ten atmospheres to a temperature which is capable of causing a reaction between them which is at least 90% complete within one minute in the absence of light and a catalyst, with a large molar excess of the material to be chlorinated over the amount of chlorine present.

7. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated under a pressure in excess of ten atmospheres and in the absence of both light and a catalyst to a temperature which under those conditions is capable of causing between them a chlorination reaction which is at least 90% complete within one minute.

8. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated to a temperature of between 100° C. and 250° C. under a pressure in excess of ten atmospheres.

9. The process of substitutively chlorinating compounds of the class consisting of saturated hydrocarbons of not to exceed sixteen carbon atoms of the paraffin and naphthene series and their partially chlorinated derivatives, which consists in subjecting a mixture of chlorine and the material to be chlorinated under a pressure in excess of ten atmospheres to a temperature which is capable of causing a reaction between them which is at least 90% complete within one minute in the absence of light and a catalyst, and separating organic chlorides so produced from co-present material.

10. The process of substitutively chlorinating compounds of the class consisting of saturated hydrocarbons of not to exceed sixteen carbon atoms of the paraffin and naphthene series and their partially chlorinated derivatives, which consists in injecting chlorine and the material to be chlorinated, with the latter in molar excess, under elevated pressure into a mixing tube, passing the mixture into a reactor maintained at a temperature sufficiently elevated to cause between the chlorine and the material to be chlorinated a chlorination reaction which is at least 90% complete within one minute in the absence of light and a catalyst, and controlling the pressure in said reactor to maintain it above ten atmospheres.

11. The process of substitutively chlorinating compounds of the class consisting of saturated hydrocarbons of not to exceed sixteen carbon atoms of the paraffin and naphthene series and their partially chlorinated derivatives, which consists in injecting chlorine and the material to be chlorinated under elevated pressure into a mixing tube, passing the mixture into a reactor maintained at a temperature sufficiently elevated to cause between the chlorine and the material to be chlorinated a chlorination reaction which is at least 90% complete within one minute in the absence of light and a catalyst, and controlling the pressure in said reactor to maintain it above ten atmospheres.

12. The process of substitutively chlorinating compounds of the class consisting of saturated hydrocarbons of not to exceed sixteen carbon atoms of the paraffin and naphthene series and their partially chlorinated derivatives, which consists in injecting chlorine and the material to be chlorinated, with the latter in molar excess, under elevated pressure into a mixing tube, passing the mixture into a reactor maintained at a temperature sufficiently elevated to cause between the chlorine and the material to be chlorinated a chlorination reaction which is at least 90% complete within one minute in the absence of light and a catalyst, controlling the pressure in said reactor to maintain it above ten atmospheres, separating the desired chlorinated product from the material which still requires substitutive chlorination to produce the desired chlorinated product, and recycling said material which still requires chlorination.

13. The process of substitutively chlorinating compounds of the class consisting of saturated hydrocarbons of not to exceed sixteen carbon atoms of the paraffin and naphthene series and their partially chlorinated derivatives, which consists in injecting chlorine and the material to be chlorinated under elevated pressure into a mixing tube, passing the mixture into a reactor maintained at a temperature sufficiently elevated to cause between the chlorine and the material to be chlorinated a chlorination reaction which is at least 90% complete within one minute in the absence of light and a catalyst, controlling the pressure in said reactor to maintain it above ten atmospheres, separating the desired chlorinated product from the material which still requires substitutive chlorination to produce the desired chlorinated product, and recycling said material which still requires chlorination.

HENRY B. HASS.
EARL T. McBEE.